US005613386A

United States Patent [19]

Mire, Sr.

[11] Patent Number: 5,613,386

[45] Date of Patent: Mar. 25, 1997

[54] SECURITY LOCK FOR PROPELLER

[76] Inventor: Jerry D. Mire, Sr., P.O. Box 1471, Morgan City, La. 70380-1471

[21] Appl. No.: 540,439

[22] Filed: Oct. 6, 1995

[51] Int. Cl.[6] F16B 41/00

[52] U.S. Cl. 70/232; 70/18

[58] Field of Search 70/232, 14, 18

[56] References Cited

U.S. PATENT DOCUMENTS

| | | | |
|---|---|---|---|
| 1,325,307 | 12/1919 | Reeder | 70/18 |
| 3,732,033 | 5/1973 | Macchi | 416/244 |
| 3,759,076 | 9/1973 | Reese | 70/232 |
| 3,981,165 | 9/1976 | Wersinger | 70/232 |
| 3,981,617 | 9/1976 | Milewicz | 416/244 B |
| 4,257,247 | 3/1981 | Sims | 70/232 |
| 4,645,422 | 2/1987 | Brushaber | 416/93 A |
| 4,697,444 | 10/1987 | Maffey | 70/232 |
| 4,715,783 | 12/1987 | Wade | 416/146 R |
| 5,184,488 | 2/1993 | Sandlin | 70/14 |
| 5,246,345 | 9/1993 | Adams, Jr. | 416/247 A |
| 5,417,093 | 5/1995 | Heiberg | 70/232 |
| 5,437,171 | 8/1991 | Owen | 70/14 |
| 5,469,721 | 11/1995 | Pyle | 70/14 |

FOREIGN PATENT DOCUMENTS

| | | | |
|---|---|---|---|
| 1028166 | 3/1978 | Canada | 70/232 |
| DL-136-595 | 7/1995 | Germany . | |

*Primary Examiner*—Steven N. Meyers
*Assistant Examiner*—Donald J. Lecher
*Attorney, Agent, or Firm*—David L. Ray

[57] ABSTRACT

A propeller lock for preventing unauthorized removal of a marine propeller from the drive shaft of a marine propeller gear housing, the marine propeller having a plurality of blades extending from a generally hollow cylindrical hub having an outer end and an inner end, the hub being connected to the drive shaft by a nut, the nut and the drive shaft being contained inside the hub and the outer end, including a cover for covering the outer end of the propeller to prevent removal of the nut, and rotatable clamps for connecting the cover to the propeller.

9 Claims, 2 Drawing Sheets

SECURITY LOCK FOR PROPELLER

BACKGROUND OF THE INVENTION

1. Field of the Invention

The invention relates to devices for preventing propellers attached to motors from being stolen. More particularly, the present invention relates to locking devices for locking marine propellers to the motors to which the propellers are connected when the motors are not in use to prevent unauthorized removal of the propellers.

2. Description of the Related Art

Theft of propellers from outboard marine engines and from marine outdrives has long been a problem for boat owners. Marine propellers are now widely available in stainless steel and are much more expensive than standard aluminum propellers and are much more likely to be stolen than standard aluminum propellers. An inexpensive locking device capable of being quickly attached to a propeller has long been needed to prevent such theft of increasingly expensive marine propellers.

As in known in the art, marine propellers on conventional outboard motors and inboard-outdrive units are commonly attached by a common internally threaded nut having a hexagonal outer surface to the threaded outer end of a splined drive shaft extending from a gear housing on the lower end of the outboard motor or inboard-outdrive through the propeller. A person desiring to steal a propeller need only remove the nut holding the propeller on the drive shaft, and slide the propeller off of the splines on the drive shaft.

Devices for preventing unauthorized removal of marine propellers are known in the art. Exemplary of the Patents of the related art are the following U.S. Pat. Nos. 5,246,345; 5,184,488; 4,697,444; and 3,981,617; and in East German Patent 136,595.

SUMMARY OF THE INVENTION

In accordance with the present invention there is provided a security lock for a propeller including a disk for covering the end of the propeller to prevent unauthorized removal of the propeller, a plurality of rods connected to the disk, and rotatable clamps for locking the disk and plate to the propeller.

The propeller lock of the present invention has the advantage of being quickly and easily attachable to a propeller to prevent unauthorized removal of the propeller.

The propeller lock of the present invention has the further advantage of being low in cost.

DESCRIPTION OF THE PREFERRED EMBODIMENTS

Figure 1:
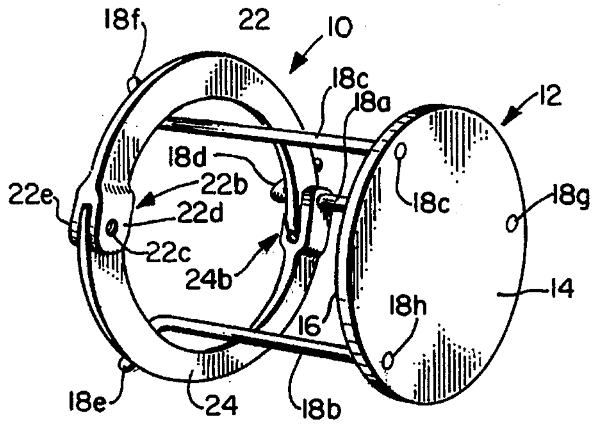
FIG. 1 is a perspective view of the security lock of the invention in the closed position.
Figure 2:
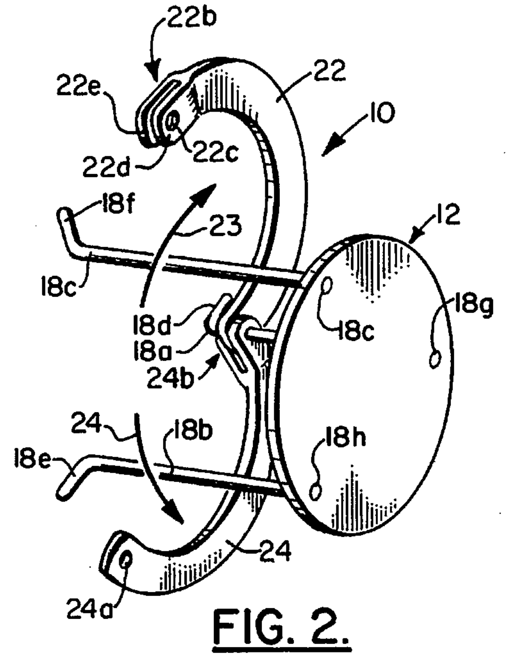
FIG. 2 is a perspective view of the security lock of the invention in the open position.

Referring now to the drawings, in FIGS. 1–4 is shown the propeller security lock of the invention generally indicated by the numeral 10. The security lock includes a circular disk generally indicated by the numeral 12 having and outer face 14 and an inner face 16.

Extending from the inner face 14 of disk 12 are three elongated rods or arms **18*a*, 18*b*, and 18*c*. One end 18*d*, 18*e*, and 18*f* of each of the rods 18*a*, 18*b*, and 18*c*, respectively, is bent generally perpendicularly to the longer portion of the elongated rods 18*a*, 18*b*, and 18*c*. The other end 18*g*, 18*h*, 18*i* of each of the rods 18*a*, 18*b*, and 18*c*, respectively, is rigidly connected to disk 12** by welding or any other conventional method.

Preferably, rods **18*a*, 18*b*, and 18*c* are circular in cross-section as shown in the drawings and are identical in shape and size. Rods 18*a*, 18*b*, and 18*c* are connected to disk 14 at equidistant intervals adjacent to the outer edge of disk 14. Furthermore, although it is preferred to utilize three rods 18*a*, 18*b*, and 18*c* in the lock of the invention, if desired, two, four, or more elongated rods may be utilized. For example, if the propeller generally indicated by the numeral 19 in FIGS. 3 and 4 had only two blades 20 rather than three blades 20** and was being secured with the present invention, two more elongated rods would preferably be utilized. Furthermore, if a propeller with four or more blades is being secured with the lock of the invention, the number of elongated rods may be selected to match the number of blades.

Two semi-circular rigid clamping members 22 and 24 are rotatably connected to elongated rod **18*a*. In FIG. 1 clamping members 22 and 24 are in the closed position, and in FIG. 2, clamping members are shown rotated as indicated by the arrows 23 and 24 to the open position. Clamping members 22 and 24 are preferably identical in size and shape. Clamping member 24 has a generally cylindrical hole or channel 24*a* at one end thereof sized for receipt of the U-shaped bar 26 of padlock 28 shown in FIG. 4 and clamping member 22 has a generally cylindrical hole or channel therein (not shown) identical to hole 24*a* at one end thereof sized for receipt of elongated rod 18*a***.

At the other end of clamping members 22 and 24 are two preferably identical U-shaped brackets generally indicated by the numerals **22*b* and 24*b*. Generally cylindrical axially aligned holes or channels 22*c* extend through both members 22*d* and 22*e* of U-shaped bracket 22*b* for receipt of U-shaped bar 26 of padlock 28, and a generally cylindrical channel (not shown) identical to generally cylindrical channel 22*c* extends through both members of U-shaped bracket 24*b* for receipt of elongated rod 18*a***.

Figure 3:
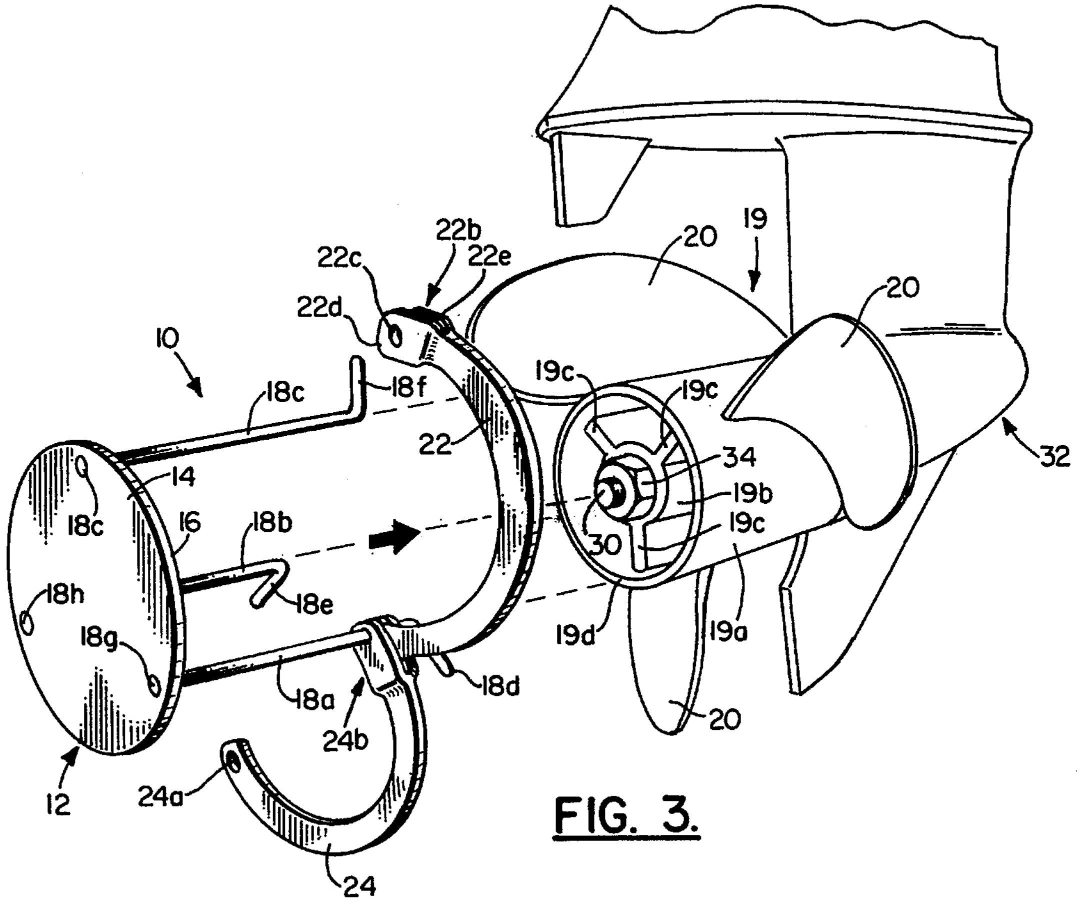
FIG. 3 is a perspective view of the security lock of the invention in the open position aligned for placement on a marine propeller.
Figure 4:
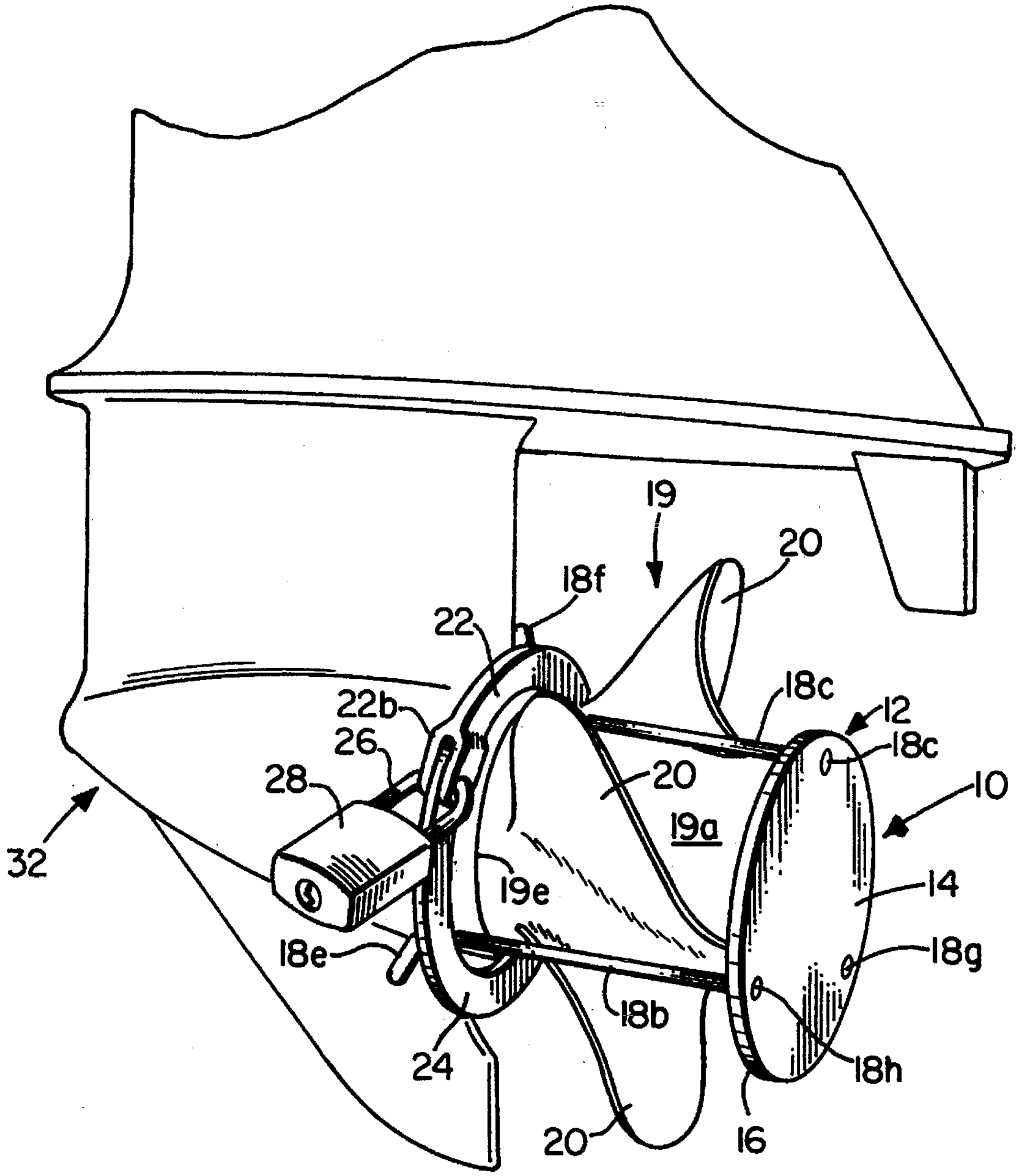
FIG. 4 is a perspective view of the security lock of the invention locked on a marine propeller.

As can be seen in FIGS. 3 and 4, a conventional marine propeller 19 is shown connected to the outdrive or gear housing generally indicated by the numeral 32 of a conventional marine engine (not shown). Marine propeller 19 has a generally cylindrical hollow hub **19*a* on which blades 20 are rigidly connected. Hub 19*a* has a generally cylindrical hollow drive shaft housing 19*b* connected to the inside of hub 19*a* by ribs 19*c*. Drive shaft 30 is received inside of drive shaft housing 19*b* . Hub 19*a* of propeller 19 is connected to the horizontally extending drive shaft 30 of gear housing 32 by internally threaded nut 34. Nut 34 and drive shaft 30 are located inside of hub 19*a* . Nut 34 and the outer end of drive shaft 30 do not extend beyond the outer end or rear annular surface 19*d* of hub 19*a* . The inner end 19*e* of hub 19*a* faces gear housing 32. Propeller 19 can be easily removed from drive shaft 30 by placing a wrench on nut 34 and rotating nut 34 from drive shaft 30, and then sliding propeller 19 off of drive shaft 30**.

To prevent unauthorized removal of nut 34 and propeller 19 from drive shaft 30, security lock 10 is axially aligned with drive shaft 30 as shown in FIG. 3, and clamping members 22 and 24 are rotated about elongated rod 18*a* as shown in FIG. 3, to enable security lock 10 to be fitted around propeller 19 as shown in FIG. 4. The bent ends 18*d*, 18*e*, and 18*f* engage the outside of clamping members 22 and 24 as shown in FIGS. 1 and 4 after clamping members 22 and 24 are rotated over rods 18*b* and 18*c*. Bolt 26 of padlock 28 is inserted into channel 22*c* as shown in FIG. 4 to securely lock propeller security lock onto propeller 19. Disk 12 is locked tightly adjacent to drive shaft 30 and nut 34, thus preventing a wrench from being placed on nut 34 to remove nut 34 and propeller 19 from drive shaft 30. Locking device 10 may be installed on a propeller quickly and easily to prevent unauthorized removal of propeller 19 from gear housing 32.

All components of the present invention are preferably constructed from a high strength, rigid material. Exemplary of such materials are steel and its various alloys such as stainless steel. If desired, high strength, fiber reinforced plastics may be used, although steel is preferred.

Although the preferred embodiments of the invention have been described in detail above, it should be understood that the invention is in no sense limited thereby, and its scope is to be determined by that of the following claims:

What is claimed is:

1. A propeller lock for preventing unauthorized removal of a marine propeller from the drive shaft of a marine propeller gear housing, said marine propeller having a plurality of blades extending from a generally hollow cylindrical hub having an outer end and an inner end, said hub being connected to said drive shaft by a nut, said nut and said drive shaft being contained inside said hub and said outer end, comprising:

a. cover means for covering said outer end of said propeller to prevent removal of said nut, said cover means comprising a disk, b. rotatable clamp means for attachment of said cover means to said propeller, said cover means being connected to said rotatable clamp means by a plurality of rods, said clamp means comprising two semi-circular members rotatably connected together at one end thereof by one of said rods, each of said semi-circular members having two ends, one of said two ends of said semi-circular members having a hole therein and the other of said two ends having a U-shaped bracket thereon, said U-shaped bracket having axially aligned holes extending therethrough, one end of one of said semi-circular members being received in said U-shaped bracket of the other of said semi-circular members and said holes therein being axially aligned, one of said rods being fitted through said axially aligned holes to rotatably connect said two semi-circular members together, each of said rods being an elongated rigid rod having two ends, one end of each of said rods having a bent portion generally perpendicular to the elongated portion of said rod for engaging the outside of said semi-circular members, said cover means being rigidly connected to each of said rods at the end of said rods opposite from said bent end of said rods.

2. The propeller lock of claim 1 wherein said rods are spaced equidistantly adjacent to the outer edge of said disk.

3. The propeller lock of claim 1 wherein clamp means have holes means therein for receipt of lock means.

4. The propeller lock of claim 1 wherein said bent ends of each of said rods means extend outwardly from the central axis of said disk a distance sufficient to engage the outside of said semi-circular members.

5. The propeller lock of claim 4 wherein said rods are spaced equidistantly adjacent to the outer edge of said disk.

6. A propeller lock for preventing unauthorized removal of a marine propeller from the drive shaft of a marine propeller gear housing, the marine propeller having a plurality of blades extending from a generally hollow cylindrical hub having an outer end and an inner end, said hub being connected to said drive shaft by a nut, said nut and said drive shaft being contained inside said hub and said outer end, comprising:

a. a disk for covering said outer end of said propeller to prevent removal of said nut, b. two semi-circular clamp means rotatably connected together at one end thereof for attachment of said propeller lock to said propeller, said clamp means being connected to said disk by a plurality of elongated rods having two ends, wherein each of said clamp means has two ends, one end of each of said rods having a bent portion generally perpendicular to the elongated portion of said rods for engaging the outside of said semi-circular clamp means, one of the two ends having a hole therein and the other end having a U-shaped bracket thereon, said U-shaped bracket having axially aligned holes extending therethrough, one end of one of said semi-circular clamp means being receivable in said U-shaped bracket of the other semi-circular member when said holes therein are axially aligned, and one of said rods is fitted through said axially aligned holes to rotatably connect said two semi-circular clamp means together, said cover means being rigidly connected to each of said rods at the end of said rods opposite from said bent end of said rods.

7. The propeller lock of claim 6 wherein said rod are spaced equidistantly adjacent to the outer edge of said disk.

8. The propeller lock of claim 6 wherein said bent ends of each of said rods extend outwardly from the central axis of said disk a distance sufficient to engage the outside of said semi-circular members.

9. The propeller lock of claim 8 wherein said rods are spaced equidistantly adjacent to the outer edge of said disk.

* * * * *